3,666,590
METHOD FOR MANUFACTURE OF CORRUGATED SYNTHETIC RESIN SHEETS

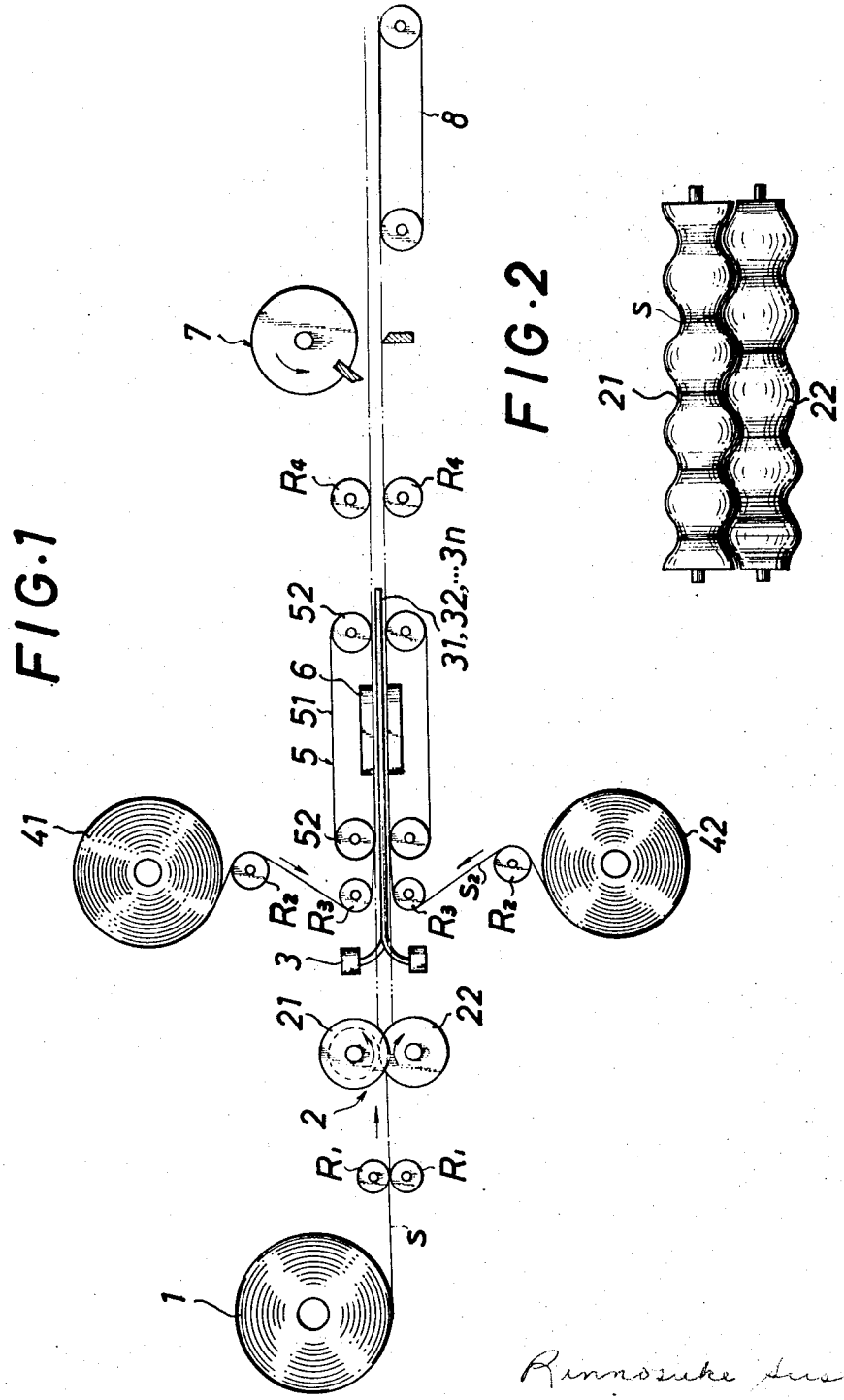

Rinnosuke Susuki, Tokyo, Hiroshi Hoshi, Narashino, and Shinichi Araki, Funabashi, Japan, assignors to Raion Yushi Kabushiki Kaisha, Tokyo, Japan
Filed Feb. 12, 1970, Ser. No. 10,797
Claims priority, application Japan, Feb. 14, 1969, 44/11,163
Int. Cl. B31f 1/24
U.S. Cl. 156—210            22 Claims

ABSTRACT OF THE DISCLOSURE

A method for manufacture of corrugated synthetic resin sheets made of ordinary synthetic resins, but specially suited for manufacture of corrugated synthetic resin sheets which are developed by the same inventor and have both properties of paper and synthetic resins. The sheet is corrugated while it is advanced so that ridges and hollows of the corrugation are formed in parallel with the direction of advancement of the sheet; and a plurality of straight backing members are extended in parallel with the direction of advancement of the sheet so that they may be placed in the hollows of the corrugated sheet, whereby when a planar sheet or sheets are bonded to one or both sides of the corrugated sheet by thermal welding or by use of an adhesive agent, the planar sheet or sheets may be pressed firmly against the corrugated sheet, thereby sufficiently improving the adhesiveness and mechanical strengths and rendering corrugated synthetic resin sheets capable of sufficiently absorbing the impact in an effective manner.

Representative figure: FIG. 1.

BACKGROUND OF THE INVENTION

The present invention relates to a method and apparatus for manufacture of corrugated synthetic resin sheets. In the conventional method for manufacture of corrugated synthetic resin sheets or so-called plastic corrugated cardboard, a length of synthetic resin sheet such as polyvinyl chloride sheet is advanced and corrugated so that the ridges and hollows are formed at right angles relative to the direction of advancement of the sheet. Thereafter, a planar sheet or sheets are bonded to one or both sides of the corrugated sheet by thermal-welding or by use of an adhesive agent. The method described above is the same as that for manufacture of corrugated cardboard. In this method, a roller having the same configuration as that of the corrugting roll may be advantageously used as a backing member when only one planar sheet is bonded to one side of the corrugated sheet, so that the planar sheet may be pressed against the corrugated sheet with sufficient force. However, when it is desired to bond another planar sheet on the other side of the corrugated sheet and when the planar sheet is pressed against the corrugated sheet too strongly, the corrugations will be deformed because only a planar backing member may be used. Therefore, the adhesiveness between the planar and corrugated sheets becomes inevitably poor.

SUMMARY OF THE INVENTION

In view of the above, the primary object of the present invention is to provide a method and apparatus for manufacture of corrugated synthetic resin sheets which can substantially eliminate the above described defect encountered in the prior art method and apparatus.

According to one of the aspects of the present invention, a synthetic resin sheet is corrugated while it is advanced in such a manner that ridges and hollows may be at right angles with respect to the direction of advancement of the sheet and a plurality of straight backing members are extended in parallel with the direction of advancement of the corrugated sheet so that they may be placed into the hollows of the corrugated sheet, whereby a planar sheet or sheets may be firmly bonded or welded to one or both sides of the corrugated sheet, thereby improving remarkably the adhesiveness and mechanical strengths of the products.

Another object of the present invention is to provide a method and apparatus for manufacture of corrugated synthetic resin sheets in which a planar sheet or sheets may be bonded or welded to one or both sides of a corrugated sheet either by thermal welding or by use of an adhesive agent.

A further object of the present invention is to provide a method and apparatus for manufacture of corrugated synthetic resin sheets in which planar sheets may be bonded or welded on both sides of a corrugated sheet at the same time so that the apparatus can be made compact in size.

A still further object of the present invention is to provide a method and apparatus for manufacture of corrugated synthetic resin sheets which are specially suited for manufacture of corrugated synthetic resin sheets from the novel sheets which have been developed by the same inventors and have both of the properties or advantages of paper and synthetic resins.

According to a method and apparatus in accordance with the present invention, ridges and hollows of corrugations are formed at right angles relative to the direction of advancement of sheet and a plurality of straight backing members are placed in the hollows when a planar sheet or sheets are bonded or welded to one or both sides of the corrugated sheet, so that the planar sheet or sheets can be firmly pressed against the corrugated sheet, thereby improving the adhesiveness and mechanical strengths either by thermal welding or by use of an adhesive agent. The method and apparatus in accordance with the present invention are best suited for manufacture of corrugated synthetic resin sheets from the novel sheet which has been developed by the same inventors and has both of the properties or advantages of paper and synthetic resins. When the novel sheet developed by the same inventors is used, it may be easily plastically corrugated at room temperature and a hot-melt type adhesive agent may be advantageously used so that the speed of production can be remarkably improved.

The above and other objects, features and advantages of the present invention will become more apparent from the following description of illustrative embodiments thereof taken in conjunction with the accompanying drawing.

BRIEF DESCRIPTION OF THE DRAWING

FIG. 1 is a diagrammatic side view of one embodiment of an apparatus in accordance with the present invention; FIG. 2 is a front view of a pair of corrugating rolls thereof.

DESCRIPTION OF THE PREFERRED EMBODIMENTS

Referring to FIG. 1, the material sheet $s$ is unwound from a material sheet supply bobbin 1 by means of a pair of rollers $R_1$ at a predetermined speed and is introduced into a corrugation forming device 2, which as best shown in FIG. 2 comprises a pair of corrugation forming rolls 21 and 22. The ridges or peaks and hollows or valleys of corrugations formed by the corrugating device are in parallel with the direction of advancement of sheet s. In other words, the direction of motion of waveform is in parallel with the axis of rotation of the roll.

As described hereinabove, the material most suited for use in the present invention is a novel material developed by the same inventors and this material has both of the properties of paper and synthetic resin. More particularly, the material sheet is obtained by kneading either or both of calcium sulfite and gypsum (70 or more) with a thermoplastic resin such as polyvinyl chloride, polyolefin plastics, etc. and calendering. This novel sheet material has remarkable features that the sheet may be easily plastically deformed at room temperature; that the sheet may be easily bonded by use of an adhesive agent of solvent type or hot-melt type; that the sheets may be welded together by applying heat; that the sheet may be easily printed or marked; and that the sheet has both of the properties of paper and synthetic resin. Thus, the sheet s can be easily corrugated by the corrugating device 2 at room temperature. When the apparatus in accordance with the present invention is desired to be used for corrugating an ordinary synthetic resin sheet such as polyethylene plastic sheets, the corrugating device 2 may be disposed in a chamber into which is introduced high temperature air or the suitable heating elements may be embedded into the rolls, so that the sheet may be corrugated while it is indirectly or directly heated. After the sheet has been corrugated, it may be cooled rapidly.

It is noted that the nip between the pair of corrugating rolls 21 and 22 may be adjusted depending upon the thickness of the sheet s.

Figure 4:
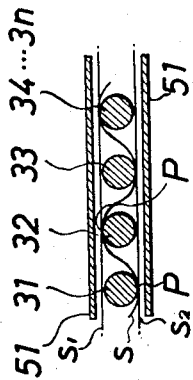
FIG. 4 is a fragmentary sectional view illustrating the relative positions between a corrugated sheet and the backing members.
Figure 3:
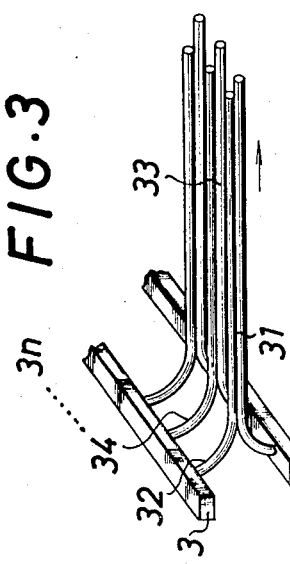
FIG. 3 is a fragmentary perspective view of backing members thereof.

A plurality of bar-shaped backing members 31, 32 and so on are securely fixed at one end thereof to back member retaining members 3 which in turn are fixed to a machine frame (not shown). The backing members 31, 32 and so on are arranged like a fork in parallel with the direction of advancement of the corrugated sheet s and are spaced apart from each other by a distance equal to the spacing between one ridge and its adjacent hollow so that the backing members 31, 32 and so on may be snugly interposed between the hollows of the corrugated sheet s as best shown in FIG. 4.

The corrugated sheet s is advanced in the direction indicated by the arrow along the backing members 31, 32 and so on as if the wave thread the backing members. Planar sheets $s_1$ and $s_2$ supplied through guide rolls R–2 and R–3 from supply bobbins 41 and 42 respectively are bonded to both sides of the corrugated sheet s. A press device generally indicated by 5 comprises a pair of upper and lower Teflon coated steel belts wrapped over rollers 52 in such a manner that the belts may be advanced at the same speed as that of the corrugated sheet s and may press by means of suitable spring means the planar sheets s–1 and s–2 sandwiching therebetween the corrugated sheet s. The press device 5 also comprises suitable heating means 6 which heats the upper and lower steel belts 51 so that the planar sheets s–1 and s–2 may be welded to the corrugated sheet s from both sides thereof along the lines of contact P. Thus, the corrugated sheet having the planar sheets welded thereto at both sides thereof into unitary construction can be provided. It should be noted that the backing members 31, 32 and so on are caused to be exteriorly lubricious with respect to the material of the sheets by being Teflon-coated to prevent adhesion of the planar sheets s–1 and s–2 and the corrugated sheet s to the backing members when the heat is applied to them.

Thus fabricated corrugated sheet is advanced by a pair of rollers R–4, cut into a predetermined length by a cutter device 7 and thereafter discharged by a suitable means such as a belt conveyor 8.

Figure 5:
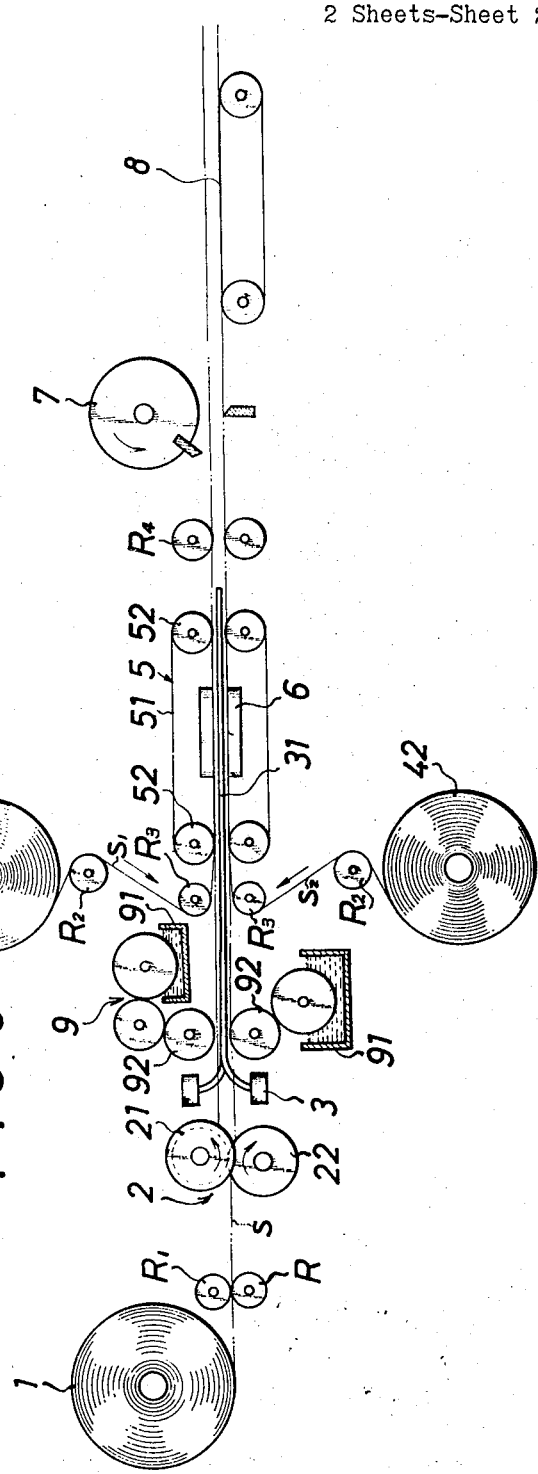
FIG. 5 is a diagrammatic side view of a second embodiment of the present invention.

Next referring to FIG. 5, the second embodiment of the present invention is described in more detail hereinafter. It should be noted that same parts are designated by same reference numeral throughout the first and second embodiments. In the second embodiment there are disposed a pair of adhesive agent application devices generally designated by 9 before the press device 5. Each of the adhesive agent application devices 9 comprises an adhesive agent reservoir 91 in which is filled a solvent or hot-melt type adhesive agent and an adhesive agent application roller 92 for applying the adhesive agent upon the ridges of the corrugated sheet s.

As described hereinabove, the apparatus in accordance with the present invention may be utilized in the best mode when the sheet developed by the same inventors is used. This sheet is easily corrugated at room temperature. It is preferable to use a hot-melt type adhesive agent which is applied to the corrugated sheet immediately it is corrugated at room temperature, because the bonding speed can be much improved as compared with a solvent type adhesive agent.

In the second embodiment, heating means 6 used in the first embodiment is not used since the planar sheets s–1 and s–2 are bonded to the corrugated sheet s by the hot-melt type adhesive agent. The mode of operation of the second embodiment will be readily understood from the description of the first embodiment so that further description will not be made.

The present invention has been so far described with particular reference to the above two illustrative embodiments thereof, but it will be understood that variations and modifications can be effected without departing from the true spirit of the persent invention as described hereinabove and as defined in the appended claims.

What is claimed is:

1. A process for manufacturing corrugated synthetic resin composite sheets, comprising:
   kneading together at least one of calcium sulfite and gypsum with a thermoplastic resin to produce a thermoplastic material mixture containing at least 70 percent by weight of at least one of calcium sulfite and gypsum;
   calendering the thermoplastic material mixture into a sheet;
   corrugating the sheet at room temperature between complementary corrugating rolls;
   applying a planar sheet to the crests on at least one face of the corrugated sheet; and
   securing the planar sheet to said crests to form a composite.

2. The process of claim 1 wherein the at least one of calcium sulfite and gypsum is kneaded with polyvinyl chloride to produce said thermoplastic material mixture.

3. The process of claim 1 wherein said planar sheet is produced by:
   kneading together at least one of calcium sulfite and gypsum with a thermoplastic resin to produce a thermoplastic material mixture containing at least 70 percent by weight of at least one of calcium sulfite and gypsum; and
   calendering the thermoplastic material mixture into a sheet.

4. The process of claim 1 wherein the at least one of calcium sulfite and gypsum is kneaded with a polyolefin to produce said thermoplastic material.

5. The process of claim 4 wherein said planar sheet is produced by:
   kneading together at least one of calcium sulfite and gypsum with a thermoplastic resin to produce a thermoplastic resin material mixture containing at least 70 percent by weight of at least one of calcium sulfite and gypsum; and
   calendering the thermoplastic material mixture into a sheet.

6. The process of claim 1 wherein the securing step includes interposing a securing agent between the regions of the corrugated sheet and the regions of the planar sheet which will contact one another before the planar sheet has been applied to the crests of said face of the corrugated sheet.

7. The process of claim 6 wherein the interposing step comprises applying a hot melt adhesive to at least one of said regions.

8. The process of claim 7 further comprising: pressing against opposite faces of the composite while applying heat thereto sufficient to activate the adhesive and while firmly supporting the composite.

9. The process of claim 7 wherein the securing step further includes: supporting each crest of the corrugated sheet, i.e. those facing both ways, from the respective rear face of each crest, by contacting the respective rear face of each crest with an exteriorly lubricious bar extending along the rear face of each crest from just after where the first-mentioned sheet is corrugated, and before the corrugated sheet has the planar sheet applied thereto, until after the planar sheet has been secured to the corrugated sheet.

10. The process of claim 6 wherein the interposing step comprises applying a solvent for a constituent of at least one of said corrugated and planar sheets to at least one of said regions and further comprising: pressing against opposite faces of the composite while applying heat thereto sufficient to dry the solvent and while firmly supporting the composite.

11. The process of claim 10 wherein the securing step further includes: supporting each crest of the corrugated sheet, i.e. those facing both ways, from the respective rear face of each crest, by contacting the respective rear face of each crest with an exteriorly lubrious bar extending along the rear face of each crest from just after where the first-mentioned sheet is corrugated, and before the corrugated sheet has the planar sheet applied thereto, until after the planar sheet has been secured to the corrugated sheet.

12. The process of claim 6 wherein the securing step further includes: supporting each crest of the corrugated sheet, i.e. those facing both ways, from the respective rear face of each crest, by contacting the respective rear face of each crest with an exteriorly lubricious bar extending along the rear face of each crest from just after where the first-mentioned sheet is corrugated, and before the corrugated sheet has the planar sheet applied thereto, until after the planar sheet has been secured to the corrugated sheet.

13. The process of claim 12 further including: applying a second planar sheet to the crests on the opposite face of the corrugated sheet.

14. The process of claim 13 wherein the bars are of constant diameter, round section and complementarily contact the rear faces of the crests.

15. The process of claim 13 wherein both planar sheets and the corrugated sheet have the same composition.

16. The process of claim 15 further including the step of printing indicia upon the exterior face of at least one of said planar sheets of said composite.

17. The process of claim 3 further including the step of printing indicia upon the exterior face of said planar sheet.

18. The process of claim 5 further including the step of printing indica upon the exterior face of said planar sheet.

19. The process of claim 6 wherein the sheets being applied to one another are of indeterminate length, being fed continuously to the corrugating step, in respect to the sheet which is corrugated, and to the applying step in respect to all of the sheets constituting the recited composite; and wherein the securing step further includes: supporting each crest of the corrugated sheet, i.e. those facing both ways, from the respective rear face of each crest, by contacting the respective rear face of each crest with an exteriorly lubricious bar extending along the rear face of each crest from just after where the first-mentioned sheet is corrugated, and before the corrugated sheet has the planar sheet applied thereto, until after the planar sheet has been secured to the corrugated sheet.

20. The process of claim 19 wherein the bars are of constant diameter round section and complementarily slidingly contact the rear faces of the crests.

21. The process of claim 20 further comprising cutting the composite into composite sheets of determinate length downstream from the downstream ends of said bars.

22. A method for manufacturing corrugated synthetic resin composite sheets comprising the steps of:
- corrugating a sheet of synthetic resin material while advancing the sheet being corrugated parallel to the longitudinal axes of the troughs and crests being formed, to produce smooth, rounded alternating troughs and crests in the sheet being corrugated;
- advancing the corrugated sheet with all troughs thereof in sliding contact with a respective plurality of round-sectioned stationary parallel bars arranged in common plane, each bar complementarily fitting the trough it engages the preserve the smooth, rounded character thereof;
- while said troughs are in said sliding contact, applying a planar sheet to the crests exposed on both faces of the corrugated sheet and securing the applied sheets to the contacted regions of the respective crests; while, contemporaneously with said applying and securing,
- pressing the two planar sheets from the respective exterior faces thereof toward said corrugated sheet, by pressing contact with said exterior faces, said pressing contact being applied in respective planar areas moving with the exterior faces,
- wherein each of the sheets is formed by kneading together at least one of the calcium sulfite and gypsum with a thermoplastic resin to produce a thermoplastic material mixture containing at least 70 percent by weight of at least one of calcium sulfite and gypsum; and
- calendering thermoplastic material mixture into a sheet.

References Cited

UNITED STATES PATENTS

| | | | |
|---|---|---|---|
| 3,378,428 | 4/1968 | Boggs | 156—471 X |
| 3,317,363 | 2/1967 | Weber | 156—210 |
| 3,071,180 | 1/1963 | Finger et al. | 156—210 X |
| 2,047,584 | 7/1936 | Harrap | 156—210 |
| 3,518,142 | 6/1970 | Dooley | 156—210 |
| 3,419,641 | 12/1968 | Peterkin et al. | 156—327 X |

BENJAMIN A. BORCHELT, Primary Examiner

G. E. MONTONE, Assistant Examiner

U.S. Cl. X.R.

156—471